July 1, 1930.    O. F. PRESBREY    1,769,234
POWER TRANSMISSION MECHANISM
Filed Oct. 11, 1926    4 Sheets-Sheet 1

INVENTOR
OTIS F. PRESBREY
BY
ATTORNEY

July 1, 1930.   O. F. PRESBREY   1,769,234
POWER TRANSMISSION MECHANISM
Filed Oct. 11, 1926   4 Sheets-Sheet 3

INVENTOR
OTIS F. PRESBREY
BY
ATTORNEY

INVENTOR
Otis F. Presbrey
BY
ATTORNEY

Patented July 1, 1930

1,769,234

UNITED STATES PATENT OFFICE

OTIS F. PRESBREY, OF BROOKLYN, NEW YORK

POWER-TRANSMISSION MECHANISM

Application filed October 11, 1926. Serial No. 140,845.

This invention relates to improvements in power transmission devices, and has particular reference to such devices employing a planetary gear set and speed changing control means.

An important object of the invention, in its broader aspects, is to provide a transmission mechanism which may be mounted as a complete unit and adaptable for connection directly or indirectly to any type of prime mover.

Another object is to provide such a transmission mechanism which will be especially useful as a power take-off unit for auxiliary purposes in connection with a main transmission unit.

A further object is to provide a transmission mechanism as a complete unit with a self-contained brake whereby operation of the driven shaft may be stopped at will without affecting the operation of the prime mover.

Another object is to provide a power take-off unit which will be particularly adapted for use with tractors and other self-propelled vehicles, thus increasing their range of usefulness.

Another object is to provide such a device which will be extremely simple in construction, strong and durable in service, efficient in operation and a substantial improvement in the art.

More specifically the invention contemplates a unitary casing preferably within which is a plural planetary gear-set, preferably of the all-spur type, mounted in conjunction with suitable brake mechanism for controlling the operation of said planetary gear-set. Provision is made for connection of a driving shaft to the gear-set, and in one form of the invention two power take-off shafts, operable at different speeds, project from the casing, while in another form of the invention, only one take-off shaft is utilized. If desired the direction of rotation may be reversed or stopped by the manipulation of convenient control means independent of the source of power, and the arrangement is such as to render the device capable of use for a wide variety of purposes. The invention will be readily understood from the following description in connection with the accompanying drawings, wherein several embodiments are shown by way of illustration, and wherein Figure 1 is a fragmentary side elevation of a tractor equipped with one form of power take-off unit in accordance with the invention;

Figure 1:
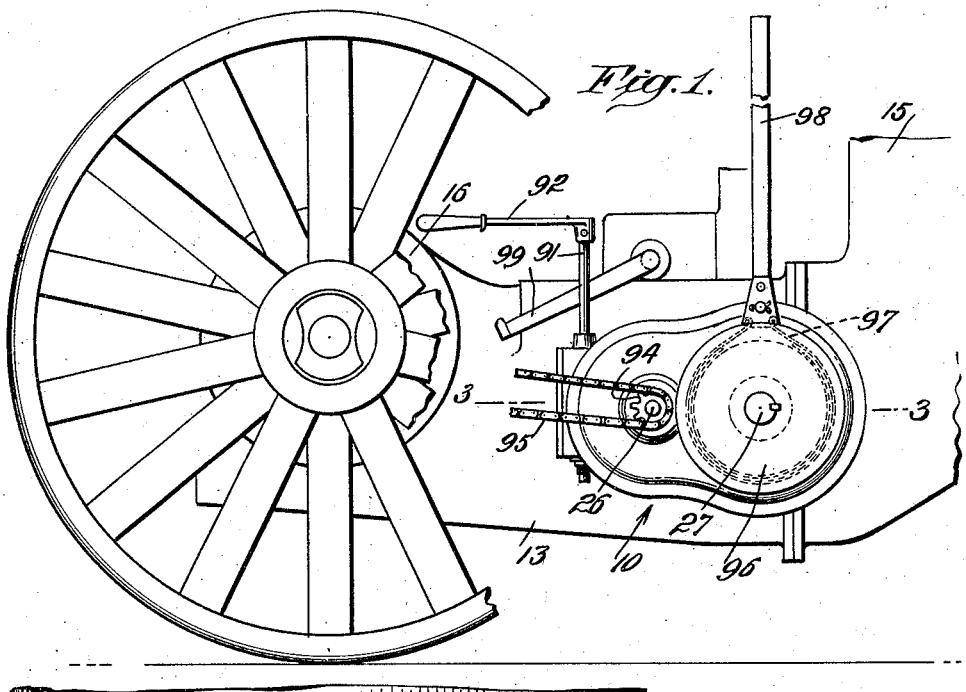

The invention has been shown in the drawings as embodied in a hoisting mechanism and applied to a tractor, but it is not restricted to such use since the salient features may be employed in other environments and with different types of prime movers. The improved transmission mechanism may be embodied in a take-off unit 10 suitably secured to the transmission case 11 of the tractor, the mechanism within the case 11 being of any conventional type and including a clutch 12, drive shaft 13, and gearing 14 by which power may be transmitted from an engine 15 to the rear axle 16 of the tractor. The drive shaft 13 is provided with a bevel gear 17, which is standard equipment in some commercial tractors and preferably disposed between the gearing 14 and clutch 12, and one wall of the transmission case is provided with a suitable opening 18, through which portions of the take-off mechanism may project for connection to the source of power.

The take-off unit 10 includes a casing 20 having a body portion 21, at one end of which is a rearwardly extending neck 22, and it is further provided with a lateral enlargements 23. The casing 20 has substantially continuous side walls and is fitted with a closure plate 24 on its front side, the construction being preferably such as to form a complete housing or enclosure for mechanism mounted within the casing. The neck portion 22 may preferably extend inwardly through the opening 18 in the main transmission case 11, and the casing 20 with its associated parts may be filmly held in place by screws 25 (see Fig. 3).

Rotatably mounted in the casing 20 and its closure plate 24 is a high speed power take-off shaft 26 and a low speed power take-off shaft 27, said shafts as illustrated being disposed parallel to each other and substantially perpendicular to the main shaft 13 of the tractor driving mechanism, although it is obvious that said shafts may be angularly disposed with respect to each other. The high speed shaft 26 is preferably composed of several sections and constitutes a driving shaft for connection to the prime mover, while the slow speed shaft 27 is driven by suitable speed reducing gears intermediate the two shafts.

The high speed shaft 26 includes a member 28 which is disposed within the neck portion 22 of the casing and preferably journalled in anti-friction bearings 29 at the inner extremity of said neck portion 22. The outer extremity of the shaft portion 28 is adapted for connection to the prime mover and in the illustrated embodiment is provided for this purpose with a bevel gear 30 meshing with the bevel gear 17 on the main shaft 13. The inner extremity of the shaft portion 28 may be squared, as at 31 (Fig. 3), said squared end being fitted within a central sleeve 32 of a flange member 33, and the sleeve 32 being also journalled in anti-friction bearings 34. A planetary gear carrier 35 is secured as by screws 36 to the flange 33 in such a manner as to be rotatable therewith, and clamped between said flange 33 and the carrier 35 is a flange portion 37 of the shaft extension 38. The shaft extension 38 is coaxial with the shaft member 28 and has secured to its forward end a sleeve 39 which extends through the closure plate 24 and which is journalled in anti-friction bearings 40. The sleeve 39 may be secured to the shaft extension 38 as by keys 41 or any other suitable means and the construction is such that the component parts of the high speed shaft 26 may be economically produced and easily assembled together.

The slow speed shaft 27 may be suitably journalled, as at 44, in the casing 20, and at 45 in the closure plate 24, said shaft preferably extending beyond the closure plate for connection of desirable mechanism for taking off power. As has been previously pointed out the shaft 27 is spaced from the shaft 26 and extends through the lateral enlargement 23 of the casing. A gear 46 is secured to the shaft 27 within said lateral enlargement 23, and said gear 46 is preferably in constant mesh with a pinion 47 carried upon an intermediate shaft. The gear 46 and pinion 47 are of the spur type when their respective shafts are parallel, and of the beveled type when their shafts are angularly disposed. The intermediate shaft referred to may preferably be hollow and concentric with and extending just beyond the flange 37 of the shaft portion 38 and has been illustrated in the drawings as including a sleeve portion 48 having at its forward end a flange 49 by which it may be secured to the pinion 47 by screws 50. The pinion 47 is concentrically mounted with respect to the sleeve 39 and capable of rotation with reference thereto, and if desired it may be fitted with a bronze bushing 51 to assist in overcoming friction and reducing the wear of the parts. At its inner extremity the sleeve portion 48 of the intermediate shaft is equipped with a control gear 52 which may be secured to the sleeve as by Woodruff keyes 53 and said gear 52 having a cylindrical section 54 which takes a bearing for rotation in the center of the gear-carrier 35. From this it will be evident that as the gear 52 is rotated its motion is transmitted through the bushing 48 and pinion 47 to the gear 46 whereby to rotate the low speed shaft 27 and that said parts are rotatable independently of the high speed shaft 26.

In order to impart motion from the drive-shaft 28 to the intermediate shaft 48 and to selectively control such imparted motion, a plural planetary gear mechanism is provided. The gear carrier 35 is fitted with a plurality of studs or shafts 60, three such shafts being illustrated in the drawings, equidistantly spaced from each other, and rotatably mounted upon each shaft 60 are a plurality of gears 61, 62 and 63 of different diameters, and preferably having teeth of the same pitch. The gears 61 are constantly in mesh with the control gear 52 which is keyed to the intermediate shaft, and as the carrier 35 is rotated, said gears 61 are carried around in a circular path and each rotating about its individual axis by virtue of their meshing engagement with the gear 52. It is necessary to control the speed of rotation of the gears 61 in order to impart motion to the gear 52, and for this purpose a pair of concentric sleeves 64 and 65 are rotatably mounted upon the hollow intermediate shaft 48. The sleeve 64 may preferably be of greater length than the sleeve 65 in such a manner that its inner extremity extends beyond the end of the sleeve 65, and said inner extremity is provided with gear teeth 66 which are constantly in mesh with the teeth of the gear 62, while the inner extremity of the sleeve 65 is similarly provided with gear-teeth 67 which are constantly in mesh with the teeth of gear 63. The diameter of the gear 62 is greater than that of the gear 61, while the diameter of the gear 63 is smaller than that of the gear 61, and the number of their teeth differing accordingly. From this it follows that if the gear 66 is held stationary while the carrier 35 is rotated, the gear 62 meshing therewith is rotated about its own axis at a definite speed and in the same direction of rotation as that of the carrier and that said definite speed and direction of rotation will be imparted to the intermediate shaft 48 through the gears 61 and the control gear 52. Similarly if the gear 66 is free and the gear 67 held against rotation, the gears 61 will be caused to rotate by virtue of the meshing of the gears 63 with the gear 67. However, the direction of rotation in this instance will be reversed because of the fact that the gear 63 is of smaller diameter than the gear 61 and the gear ratios between the cooperating gears being different in each instance. Plural planetary gear sets of this character are comparatively well known to those skilled in the art and therefore a more detailed discussion as to the theory of operation, particularly with respect to the reversal, is deemed unnecessary.

Figure 2:
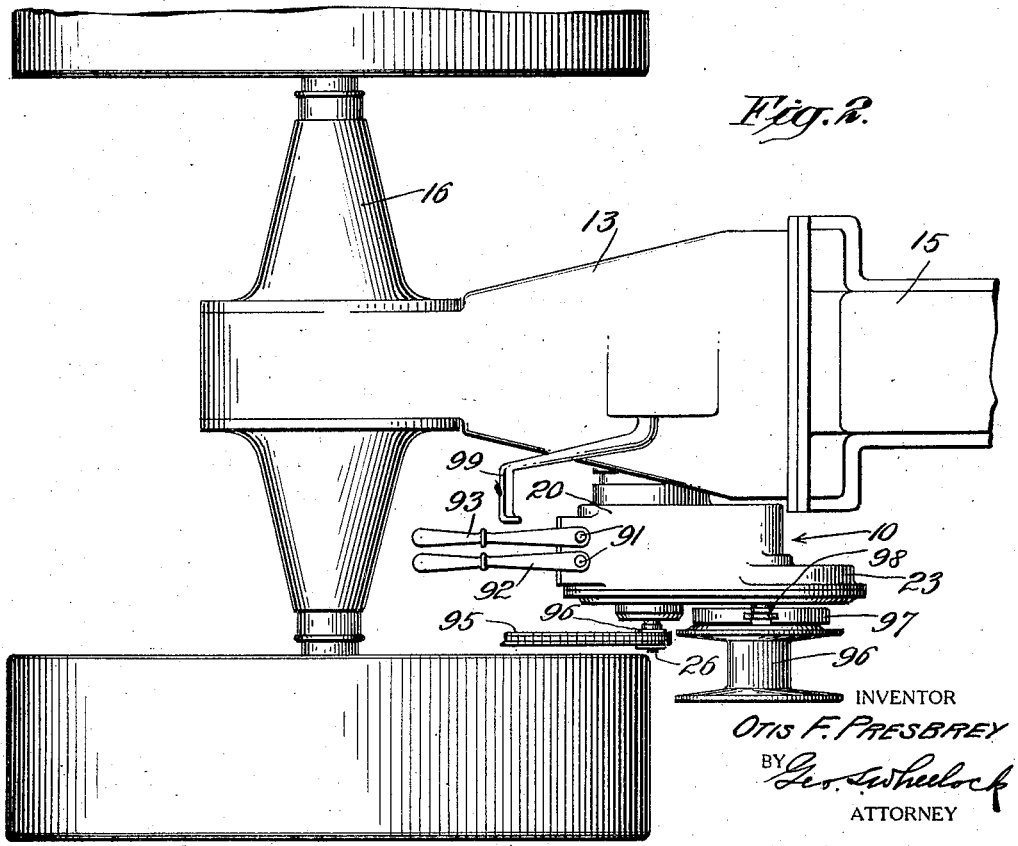
Figure 2 is a top plan view thereof.
Figure 4:
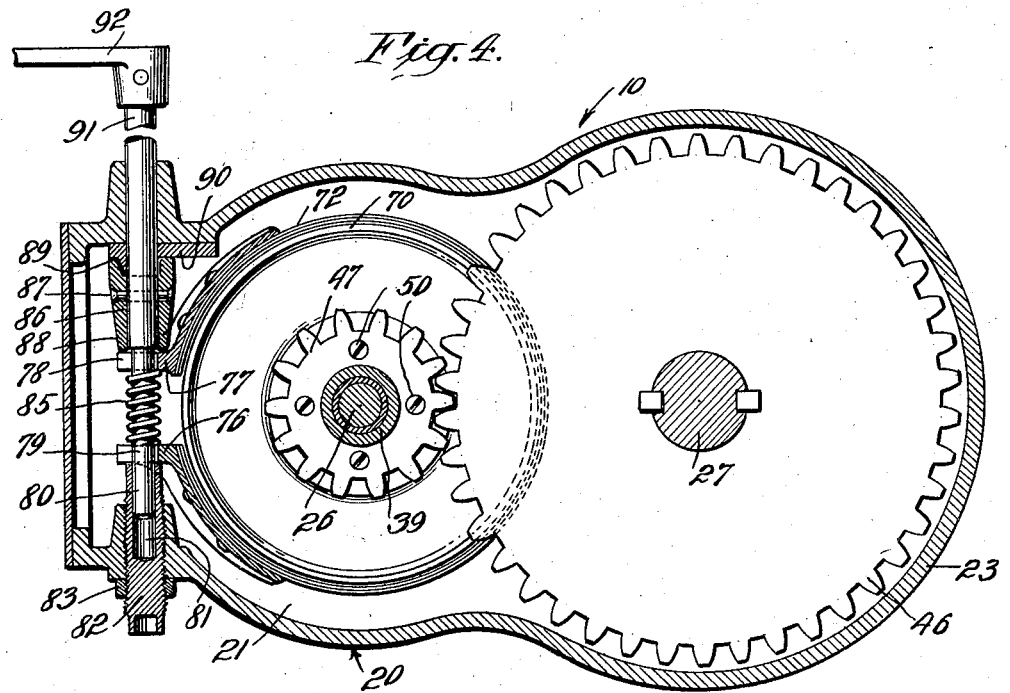
Figure 4 is a vertical longitudinal sectional view on line 4—4 of Figure 3.
Figure 5:
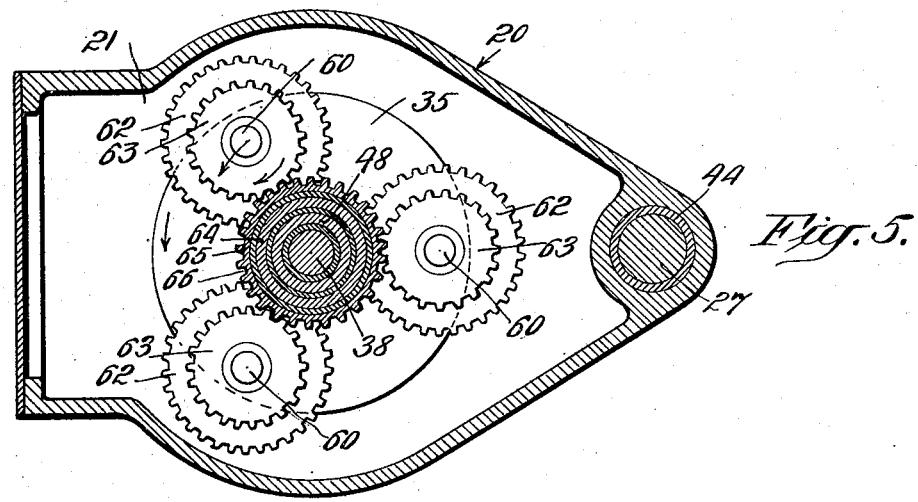
Figure 5 is a similar view on line 5—5 of Figure 3.

In order to selectively control the rotation of the intermediate shaft suitable brake mechanisms are provided in the form of circular brake drums 70 and 71 which are respectively mounted with the sleeves 64 and 65 and of sufficient width to present a substantial circumferential area for frictional engagement of brake bands 72 and 73. As best shown in Figure 4 the brake bands are of a well known form and fitted at their meeting ends with lugs 76 and 77, said lugs opposing each other and suitably bifurcated or apertured as at 78 to permit the passage of an actuating rod 79. The lower extremity 80 of the rod 79 is received within a bore 81 of an adjusting screw 82, said adjusting screw 82 extending through one wall of the casing 20 and being fitted with a lock-nut 83 to facilitate adjustment and locking of the parts. Disposed between the lugs 76 and 77 and encircling the corresponding portion of the rod 80 is a compression spring 85 which normally tends to force the lugs apart and thus releasing the brake bands from frictional engagement with the brake drums. A cam 86 is secured to the rod 80 as by a rivet 87 in such position that its lower end 88 is adapted to engage the upper surface of the lug 77, while its upper end 89 is provided with an inclined cam surface for engagement with a stationary arm 90 secured within the casing 20. It is of course understood that each of the brake bands 72 and 73 is connected with an actuating rod 80 and cam 86 and that both of the rods 80 have their upper extremities 91 extending above the casing and fitted with operating handle 92 and 93. The neutral positions of the handles 92 and 93 are best illustrated in Figure 2 and preferably in their operation each handle is moved away from the other to effect frictional engagement of its corresponding brake band. Thus it will be seen that the two shafts 26 and 27 are rotatable at different speeds and that the rotation of the shaft 27 may be selectively controlled independently of the shaft 26.

Various mechanisms may be employed for taking off power from the two shafts and for this purpose, by way of illustration, the shaft 26 has been equipped with a sprocket 94 from which a chain or belt 95 may run over a driven sprocket. This high speed drive has been found highly desirable for many purposes and the chain 95 may be employed for operating a circular saw, ensilage cutter, electric generator, etc. The slow speed shaft 27 has been illustrated in the drawings as equipped with a hoisting drum 96 fitted with a brake band 97 of any desired type, said brake being operated by means of a substantially vertical handle 98. Obviously the hoisting drum 96 may be replaced by a nigger-head or by gearing or the like for operation of other types of machinery, and the hoisting drum is capable of transmitting substantially the full power of the motor 15 either for ordinary hoisting purposes or for snaking logs, pulling stumps, etc.

The tractor is provided with a foot pedal 99 for selectively connecting and disconnecting the clutch 12, and in the case of the "Fordson" tractor, depression of the pedal 99, beyond the point of disengaging the clutch, actuates a brake to stop rotation of the shaft 13. This brake may also be taken advantage of in operating the take-off unit as will later be described.

When in use the improved transmission mechanism may be mounted as described and preferably the interior of the neck portion 22 of the casing 20 is in communication with the interior of the main casing 11 of the tractor in such a manner that the same lubricating oil may be circulated through both casings for properly lubricating all of the mechanism. As the engine 15 or other prime mover is operated with the clutch 12 in engagement, the gear 17 is rotated and this in turn communicates motion to the gear 30, shaft 28, and the gear carrier 35. By virtue of the flange connections 33 and 37 and the shaft section 38 and connected sleeve 39, the sprocket 94 will be rotated simultaneously with the gear 30 and at the same speed. When the operating handles 92 and 93 are in their neutral positions, as shown in Figure 2, both of the brake drums 70 and 71 will be free to rotate and as a result the gears 61 will idly roll around the central gear 52 without communicating motion to the intermediate shaft. At the same time the operator will preferably depress the pedal 99 to release the clutch 12 and apply its brake. The operator may then grasp the handle 92 and move it in a counter clockwise direction whereby to actuate the cam 86 and thus depress the lug 77 towards the lug 76, thereby causing the brake band 72 to frictionally engage the outer periphery of the brake drum 70. The pedal 99 may then be released to impart motion to the transmission mechanism and in this condition the gear 66 will be held against rotation, and thus the gears 62 will be caused to positively rotate upon their own axes carrying with them the gears 61 and 63. Since the brake drum 71 is not held against rotation it will merely idle, while the central gear 52 and the intermediate shaft to which it is connected will be given a positive rotary motion in the same direction as that of the gear carrier 35. In this manner the hoisting drum 96 is caused to rotate by virtue of the meshing of the gears 46 and 47, said drum having a much slower speed than the drive shaft 28. In order to stop the rotation of the hoisting drum it is merely necessary for the operator to step on pedal 99 and to release the handle 92, allowing it to return to its neutral position and, if desired, he may at the same time manipulate the handle 98 to actuate the hoist brake 97. The rotation of the hoisting drum 96 may be reversed by manipulation of the handle 93, its movement in a clockwise direction resulting in clamping the drum 71 and gear 67 against rotation. In this condition the rotation of the plural planetary gears is controlled by the meshing of the gears 63 with the stationary gear 67, and since the diameter of the gears 67 is larger than that of the gear 52, the gear 52 and the intermediate shaft will be rotated in a reverse direction.

When the improved mechanism is mounted as a complete unit, the parts are compactly arranged and may readily be mounted in various desirable environments either in a tractor or connected directly or indirectly with other prime movers. The tractor which has been partially illustrated in the drawings is of the well known commercial "Fordson" type and the invention has been found to be particularly adaptable for use with this machine. The construction of the improved unit is very simple, thereby rendering it capable of economical manufacture and it has been found to be strong and durable in service and highly efficient for many different uses. The control levers are conveniently located for actuation by the operator of the device and the slow speed shaft 27 may be operated either when the tractor is standing still or moving under its own power. A further important feature is that said take-off shaft 27 need not rotate at all times when the engine 15 is operated because it can easily be disconnected as previously explained.

In some mechanisms contemplated by the present invention it is not necessary to provide rotation of the power take-off shaft in opposite directions. Furthermore it is desirable in some instances to provide the take-off unit with a self-contained brake within the casing. Such devices are clearly illustrated in Figures 6 and 7.

Figure 3:
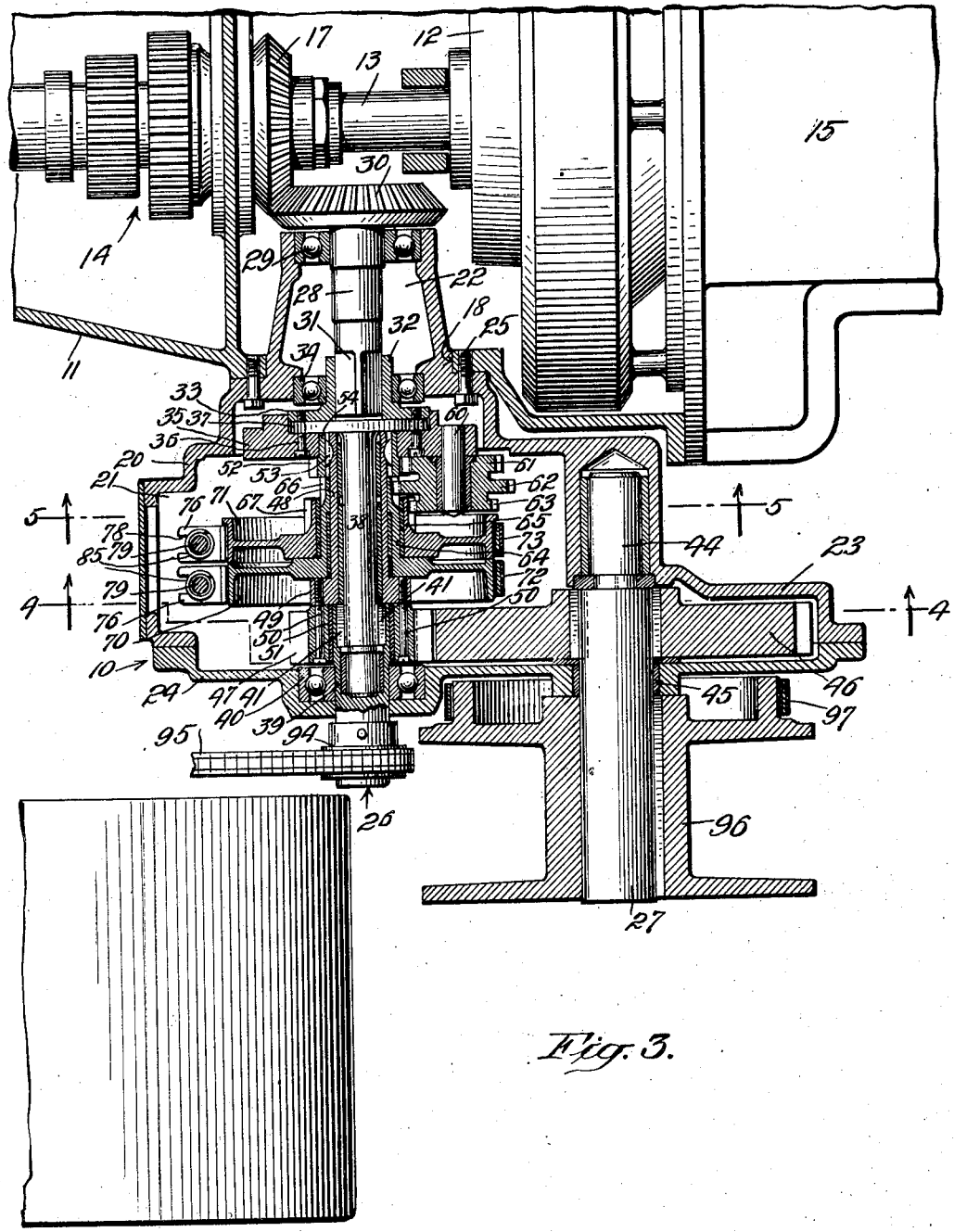
Figure 3 is a horizontal transverse sectional view on line 3—3 of Figure 1.
Figure 6:
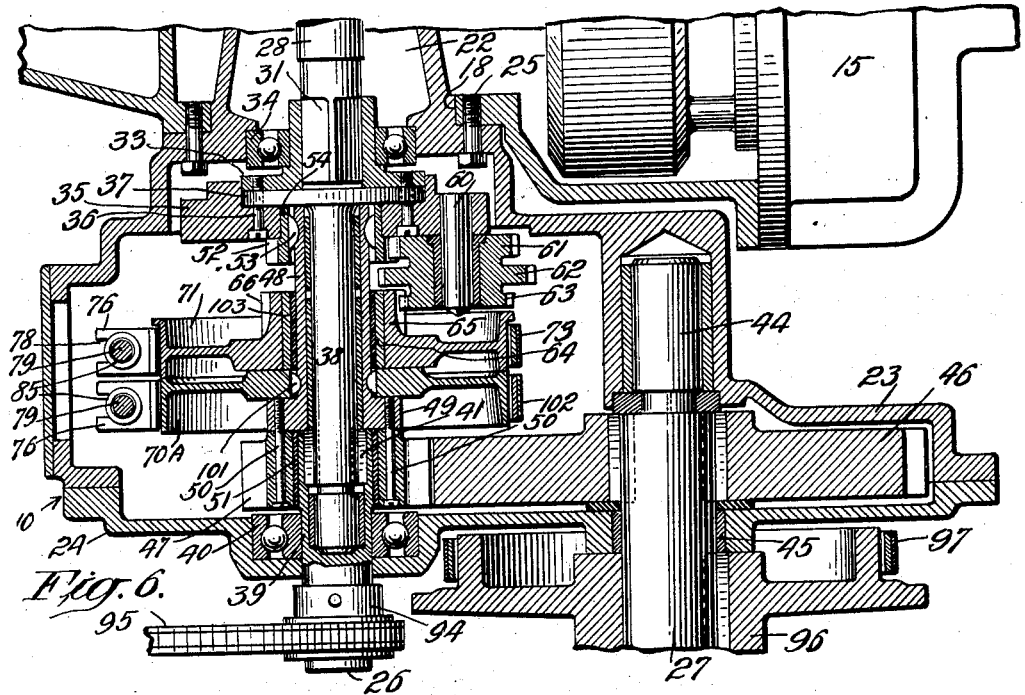
Figure 6 is a view similar to Figure 3 and illustrating a preferred modification of the invention.

Referring to Figure 6 it will be seen that the construction is very similar to that illustrated in Figure 3 with the exception that a brake drum 70A is secured by means of keyes 101 to the sleeve 48 of the intermediate shaft in such a manner as to be rotatable therewith. The brake drum 70A is surrounded by a brake band 102 similar to the brake band 72 and operable in a like manner. The planetary gears 63 are in mesh with the driving gear 66, while the planetary gears 62 do not function. A bushing 103 is fitted within the sleeve 65 in order to properly space the same from the intermediate shaft, said bushing 103 terminating flush with the end of the gear 66. It will be evident from the foregoing that as the brake band 73 is tightened by actuation of the handle 93, the brake drum 71 and its associated gear 66 will be held against rotation, and by virtue of the meshing of the planetary gears 63 with the gear 66 a positive rotation is imparted to the driven gear 52 and the intermediate shaft.

Figure 7:
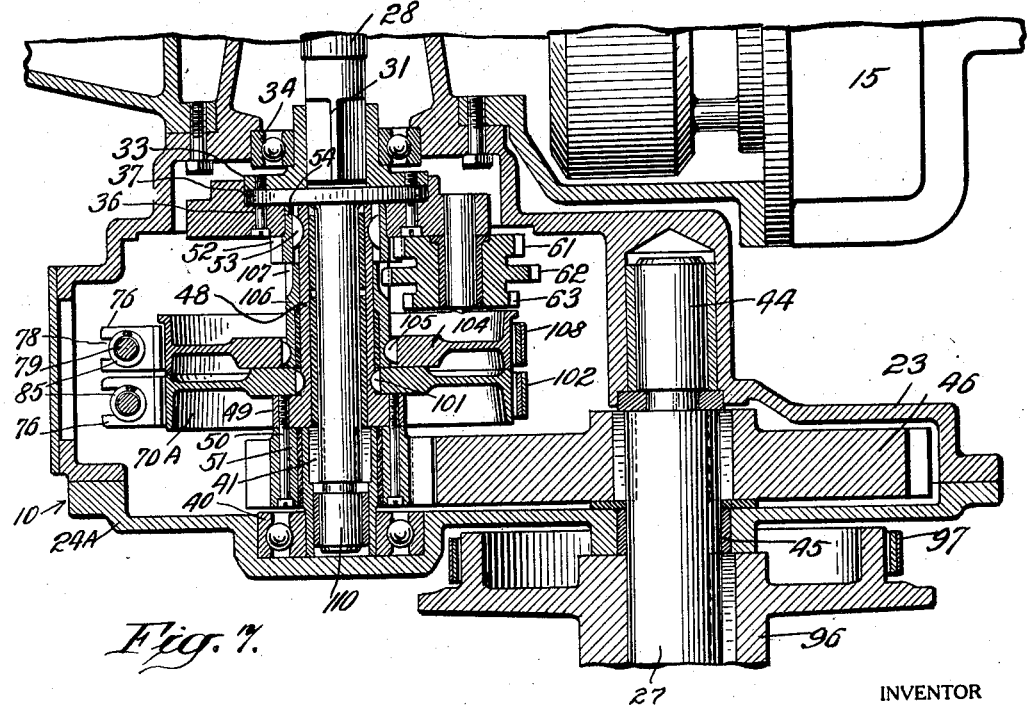
Figure 7 is another view similar to Figure 3 and illustrating still another modification of the invention.

In Figure 7 another modification is illustrated wherein the direction of rotation of the hoisting drum 96 is opposite to that of the mechanism illustrated in Figure 6. For accomplishing this purpose a brake-drum 104 is keyed at 105 to a sleeve 106, said sleeve being mounted upon and capable of rotation with respect to the sleeve 48, the inner extremity of the sleeve 106 is provided with a driving gear 107 which is constantly in mesh with the planetary gears 62. The brakedrum 104 may be selectively held against rotation by tightening a brake band 108 similar to the brake-band 73 and in this manner rotation of the intermediate shaft is effected in the opposite direction from that of Figure 6. In operating a take-off unit, such as illustrated in Figures 6 and 7, rotation of the take-off shaft 27 and its associated hoisting drum or the like may be quickly arrested by actuation of the brake band 102 and when such a brake is provided, the brake 97 on the hoisting drum may be omitted if desired.

Another variation is illustrated in Figure 7 with respect to the closure plate of the transmission casing. In this instance the closure plate 24A is not apertured for the reception of a sleeve 39, such as is illustrated in Figure 3. The result is that the high speed power take-off shaft is eliminated, said shaft terminating at 110 within the closure plate 24A.

The construction and arrangement of the parts is such that they may be interchangeably assembled in different types of take-off units dependent upon the specific environment in which they are to be used, and this feature of interchangeability is particularly desirable in that it reduces the number of parts which must be carried in stock and correspondingly reduces the manufacturing cost of the several units. Obviously other changes may be resorted to in the details of construction and arrangement of parts and the right is herein reserved to make such changes as fall within the scope of the appended claims without departing from the spirit of the invention.

Having thus described my invention, what I claim is:

1. In combination with the power transmission unit of an automotive vehicle, a power take-off unit mounted at one side thereof, and comprising a casing adapted for securement to said power transmission unit, said casing having a neck portion extending transversely into the casing of said power transmission unit; a driving shaft journalled for rotation in said neck portion and provided at its extremity with a bevel gear for operative connection to a power shaft within the power transmission unit; a driven shaft journalled in the casing in laterally spaced parallel relation to the said driving shaft, said driven shaft extending outwardly from the casing in a direction opposite to that of said neck portion; an intermediate shaft journalled in the casing in axial alinement with the driving shaft; meshing gears rotatively connecting said intermediate shaft with said driven shaft; a planetary gear set for transmitting motion from the driving shaft to said intermediate shaft; and frictional engaging means for controlling the action of said planetary gear set.

2. In combination with the power transmission unit of an automotive vehicle, a power take-off unit mounted at one side thereof, and comprising a casing adapted for securement to said power transmission unit, a driving shaft journalled for rotation in the casing and provided at its extremity with a bevel gear for operative connection to a power shaft within the power transmission unit, a driven shaft journalled in the casing in laterally spaced parallel relation to said driving shaft, said driven shaft extending outwardly from the casing for supplying auxiliary power extraneous to the road wheels of the vehicle, an intermediate shaft journalled in the casing in axial alignment with the driving shaft, meshing gears rotatively connecting said intermediate shaft with said driven shaft, a planetary gear set for transmitting motion from the driving shaft to said intermediate shaft, and frictional engaging means for controlling the action of said planetary gear set.

3. In combination with the power transmission unit of an automotive vehicle, a power take-off unit mounted at one side thereof, and comprising a casing adapted for securement to said power transmission unit, a driving shaft journalled for rotation in the casing and provided at its extremity with gear means for operative connection to a power shaft within the power transmission unit, a driven shaft journalled in the casing in laterally spaced parallel relation to said driving shaft, said driven shaft extending outwardly from the casing for supplying auxiliary power extraneous to the road wheels of the vehicle, an intermediate shaft journalled in the casing in axial alignment with the driving shaft, meshing gears rotatively connecting said intermediate shaft with said driven shaft, and means for selectively controlling the rotation of the intermediate shaft from said driving shaft.

OTIS F. PRESBREY.